United States Patent
Wang et al.

(10) Patent No.: US 11,942,987 B2
(45) Date of Patent: Mar. 26, 2024

(54) METHODS, SYSTEMS, APPARATUSES AND MEDIA FOR MEASURING AN OPTOELECTRONIC DEVICE AND/OR A CHANNEL

(71) Applicant: Shan Dong Sitrus Technology Co., Ltd., Shandong (CN)

(72) Inventors: Hui Wang, Jinan (CN); Jiongming Wang, Jinan (CN)

(73) Assignee: SHAN DONG SITRUS TECHNOLOGY CO., LTD., Jinan (CN)

( * ) Notice: Subject to any disclaimer, the term of this patent is extended or adjusted under 35 U.S.C. 154(b) by 79 days.

(21) Appl. No.: 17/707,731

(22) Filed: Mar. 29, 2022

(65) Prior Publication Data
US 2022/0311511 A1 Sep. 29, 2022

(30) Foreign Application Priority Data
Mar. 29, 2021 (CN) .......................... 202110335135.3

(51) Int. Cl.
*H04B 10/077* (2013.01)

(52) U.S. Cl.
CPC .................................. *H04B 10/077* (2013.01)

(58) Field of Classification Search
CPC .................................................. H04B 10/077
(Continued)

(56) References Cited

U.S. PATENT DOCUMENTS

| | | | | |
|---|---|---|---|---|
| 3,973,112 A | * | 8/1976 | Sloane | G01M 7/025 324/76.21 |
| 3,988,667 A | | 10/1976 | Roth et al. | |
| 4,023,098 A | * | 5/1977 | Roth | G01R 27/28 324/76.15 |

(Continued)

FOREIGN PATENT DOCUMENTS

| | | |
|---|---|---|
| CA | 1043016 A | 11/1978 |
| CA | 2410749 A1 | 5/2004 |

(Continued)

OTHER PUBLICATIONS

Salamin et al; Compact and ultra-efficient broadband plasmonic terahertz field detector ; 2019; Nature Communications; pp. 1-9. (Year: 2019).*

(Continued)

*Primary Examiner* — Amritbir K Sandhu
(74) *Attorney, Agent, or Firm* — BakerHostetler

(57) ABSTRACT

The present disclosure provides a method. The method comprises: Step S1: configuring a periodic excitation source to transmit a periodic excitation signal A; Step S2: sampling an output signal $A+N_A$ at an output point of the periodic excitation signal A with a sampling device AA, and averaging the output signal $A+N_A$ over one or more periods to filter noise; Step S3: inputting the sampled output signal $A+N_A$ as in input to a device or a channel H to be measured; Step S4: sampling an output signal $B+N_B$ at an output point of the device or the channel H to be measured with a sampling device BB, and averaging the output signal $B+N_B$ over one or more periods to filter noise; and Step S5: transmitting sampling results from the sampling device AA and the sampling device BB to an analysis software C to calculate a transfer function of the device or the channel H to be measured.

13 Claims, 1 Drawing Sheet

(58) Field of Classification Search
USPC ........................................................ 398/16
See application file for complete search history.

(56) References Cited

U.S. PATENT DOCUMENTS

| | | | | |
|---|---|---|---|---|
| 9,009,640 | B1* | 4/2015 | Atcitty | ................. G06F 30/367 |
| | | | | 716/113 |
| 10,684,258 | B2* | 6/2020 | Couillard | ............... G01R 25/00 |
| 2003/0090275 | A1 | 5/2003 | Ioannou | |
| 2008/0298801 | A1* | 12/2008 | King | ................. H04B 10/0731 |
| | | | | 398/26 |
| 2014/0201581 | A1* | 7/2014 | Shen | ................ G01R 31/31937 |
| | | | | 714/725 |
| 2022/0311511 | A1* | 9/2022 | Wang | ................... H04B 10/077 |

FOREIGN PATENT DOCUMENTS

| | | |
|---|---|---|
| CN | 1103618568 A | 3/2014 |
| CN | 103823175 A | 5/2014 |
| CN | 105277933 A | 1/2016 |
| CN | 106197807 A | 12/2016 |
| CN | 107872762 A | 4/2018 |
| CN | 108152362 A | 6/2018 |
| CN | 108226305 A | 6/2018 |
| CN | 109358232 A | 2/2019 |
| CN | 110441621 A | 11/2019 |
| CN | 113091795 A | 7/2021 |
| EP | 0172499 A2 | 2/1986 |
| EP | 1162759 A2 | 12/2001 |
| JP | H01-315800 A | 12/1989 |

OTHER PUBLICATIONS

Salamin et al.; Compact and ultra-efficient broadband plasmonic terahertz field detector ; 2019; Nature Communications; pp. 1-8. (Year: 2019).*

International Patent Application No. PCT/CN2022/083625; Int'l Search Report; dated Jul. 5, 2022; 3 pages.

* cited by examiner

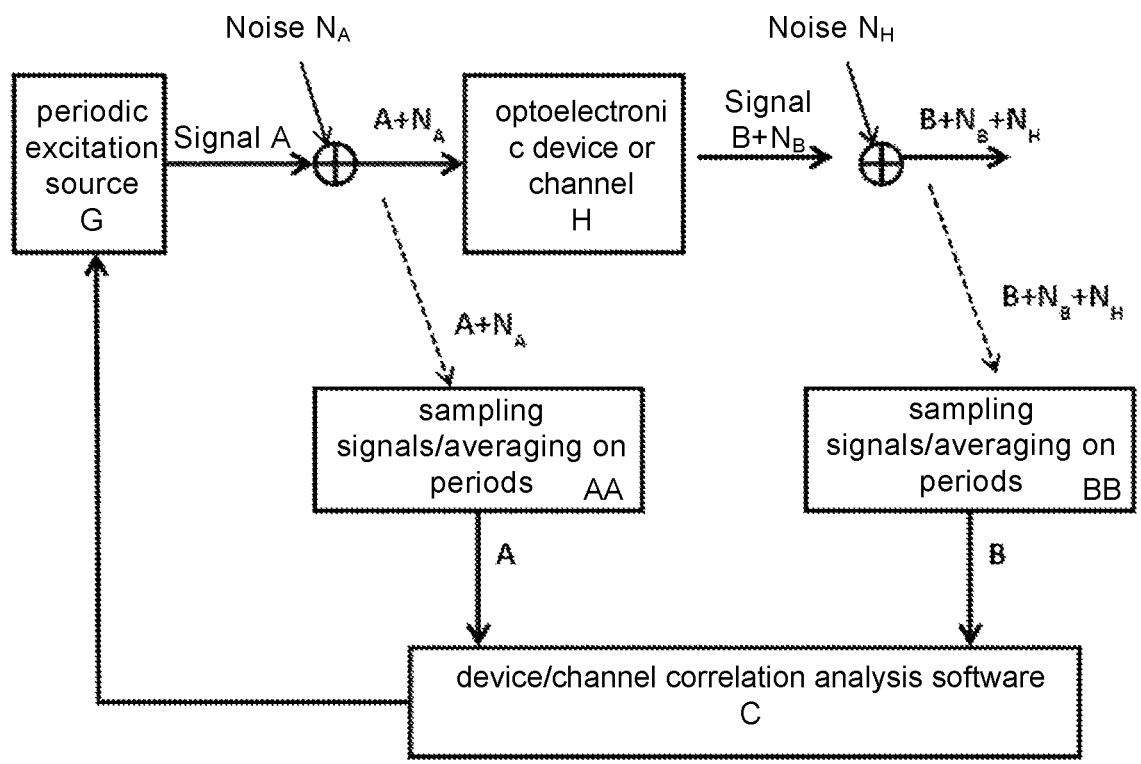

METHODS, SYSTEMS, APPARATUSES AND MEDIA FOR MEASURING AN OPTOELECTRONIC DEVICE AND/OR A CHANNEL

CROSS REFERENCE TO THE RELATED APPLICATION

This application claims the priority and benefits of a Chinese Patent Application No. 202110335135.3 filed by WANG et. al on Mar. 29, 2021, the contents of which are incorporated herein in its entirety by reference.

TECHNICAL FIELD

The present disclosure relates to optoelectronics, and more specifically relates to a method, system, apparatus and medium for measuring an optoelectronic device and/or a channel.

BACKGROUND

Property of transmission from an electrical signal to an electrical signal may be measured by a network analyzer or a time domain transmissions (TDT). However, these devices are usually only capable of measuring electrical signals. Property of transmission from optical signals to electrical signals, from electrical signals to optical signals or from optical signals to optical signals cannot be measured by commonly-used test devices. Also, the measurement accuracy is affected by noise.

Patent No. CN108007564A disclosing a large dynamic range optoelectronic signal measuring system and a measuring method thereof is retrieved through searching, which comprises an optical fiber bundle unit, an optoelectronic sensing unit and an analysis and determination unit. The optical fiber bundle unit has a plurality of optical fiber input ends and a plurality of optical fiber output ends. The optoelectronic sensing unit comprises a plurality of optoelectronic sensing subunits. The optical fiber bundle unit transmits an optical signal from any one of the input ends in proportion to each of the output ends simultaneously by way of optical fiber bundle recombination, wherein each of the output ends corresponds to an optoelectronic sensing subunit of the optoelectronic sensing unit, and each of the optoelectronic sensing subunits converts the optical signal linearly into an electrical signal and outputs it to the analysis and determination unit. The analysis and determination unit analyzes the electrical signal and determines a final measurement value of the optoelectronic signal. The deficiency of the prior art is in that a special measurement system for the optoelectronic signal is required for the measurement, and the optoelectronic signal can be measured only after the optical signal has been converted into the electrical signal.

Therefore, it is urgent to develop a system and a method capable of measuring an electrical signal and an optoelectronic signal or an optical signal.

SUMMARY

As to the deficiency of the prior art, an object of the present disclosure is to provide a methods, system, apparatus and medium for measuring an optoelectronic device and/or a channel.

According to the present disclosure, a method for measuring an optoelectronic device and/or a channel is provided. The method comprises the following steps:

Step S1: configuring a periodic excitation source to transmit a periodic excitation signal A;

Step S2: sampling an output signal $A+N_A$ at an output point of the periodic excitation signal A with a sampling device AA, and averaging the output signal $A+N_A$ over one or more periods to filter noise;

Step S3: inputting the sampled output signal $A+N_A$ as in input to a device or a channel H to be measured;

Step S4: sampling an output signal $B+N_B$ at an output point of the device or the channel H to be measured with a sampling device BB, and averaging the output signal $B+N_B$ over one or more periods to filter noise; and Step S5: transmitting sampling results from the sampling device AA and the sampling device BB to analysis software C to calculate a transfer function of the device or the channel H to be measured.

In an embodiment, the periodic excitation signal A in step S1 is obtained by performing convolution in time domain on a pulse waveform and an impulse sequence of code patterns in time domain, wherein the periodic excitation signal A can be generated by a code pattern generator, an arbitrary waveform generator, a chip or an apparatus capable of such function.

In an embodiment, noise signal is filtered by averaging one or more sets of periodic excitation signals A from sampled code patterns in Step S2.

In an embodiment, the excitation signal is selected as an electrical signal or an optical signal, and a corresponding electrical interface or optical interface is selected for the sampling device, according to the requirements by the device or the channel to be measured.

In an embodiment, the pulse transfer function of the device or the channel H to be measured is a normalization result of a product of the output signal and impulse sequences in time domain of the input signal.

In an embodiment, when the periodic excitation signal A is not an ideal pulse output, the pure transfer function of the device or the channel to be measured is obtained by deriving a pulse response transfer function of A according to a product of A and an impulse sequence in time domain of the input signal, and then eliminating a pulse response effect of A from a pulse response transfer function obtained at point B via deconvolution.

According to the present disclosure, a system for measuring an optoelectronic device and/or a channel is provided. The system comprises a processor and a memory, the memory communicatively coupled to the one processor and comprising computer-readable instructions that upon execution by the processor cause the processor to:

Module M1: to configure a periodic excitation source to transmit a periodic excitation signal A;

Module M2: to sample an output signal $A+N_A$ at an output point of the periodic excitation signal A with a sampling device, and averaging the output signal $A+N_A$ over one or more periods to filter noise;

Module M3: inputting the sampled output signal $A+N_A$ as in input to a device or a channel H to be measured;

Module S4: sampling an output signal $B+N_B$ at an output point of the device or the channel H to be measured with a sampling device, and averaging the output signal $B+N_B$ over one or more periods to filter noise; and Module M5: to transmit sampling results from the sampling device AA and the sampling device BB to an analysis software C to calculate a transfer function of the device or the channel H to be measured, and to obtain performance indexes such as loss, reflection and bandwidth of the device or the channel H to be measured.

According to the present disclosure, a computer readable storage medium having computer programs stored thereon is provided. The computer programs are executed by a processor to implement the steps of the above mentioned method.

According to the present disclosure, a measurement apparatus is provided. The measurement apparatus comprises a system for measuring an optoelectronic device and/or a channel as recited above or a computer readable storage medium having computer programs stored thereon as recited above.

Compared with the prior art, the present disclosure has the following benefits:

1. In the present disclosure, noise introduced during measurement is filtered by sampling and averaging periodic signals with hardware and selecting a periodic excitation satisfying randomness and correlation.
2. In the present disclosure, calculations are made on the signals sampled at the input and output of the device or the channel to be measured, which enables the transfer function between the input/output to be obtained by sampling a code pattern generator and an oscilloscope which are common in a laboratory, and solves a problem that the transfer function of the device or the channel in a transmission path from an optical signal to an electrical signal, from an electrical signal to an optical signal, or from an optical signal to an optical signal cannot be measured conveniently in practice.
3. In the present disclosure, the transfer function of the device or the channel in a transmission path from an electrical signal to an optical signal can also be measured by commonly-used devices such as a signal generator, an oscilloscope, without requiring a special equipment such as a network analyzer or a time domain transmission (TDT).

DESCRIPTIONS OF THE DRAWINGS

Other features, objects, and advantages of the present disclosure will become more apparent by reading the detailed description of non-limiting embodiments with reference to the following drawing:

FIG. 1 is an overall schematic flow diagram of the present disclosure.

DETAILED EMBODIMENTS

The present disclosure is described in detail below in connection with specific embodiments. The following embodiments are intended to assist those skilled in the art in further understanding the present disclosure, rather than limiting the present disclosure in any way. It should be noted for those skilled in the art that several variations and improvements can be made to the present application without departing from the conception of the present disclosure, all of which fall within the scope of protection of the present disclosure.

As shown in FIG. 1, the present disclosure provides a method for measuring an optoelectronic device and/or a channel. The method comprises the following steps:

Step S1: configuring a periodic excitation source to transmit a periodic excitation signal A;

Step S2: sampling an output signal $A+N_A$ at an output point of the periodic excitation signal A with a sampling device AA, and averaging the output signal $A+N_A$ over one or more periods to filter noise;

Step S3: inputting the sampled output signal $A+N_A$ as in input to a device or a channel H to be measured;

Step S4: sampling an output signal $B+N_B$ at an output point of the device or the channel H to be measured with a sampling device BB, and averaging the output signal $B+N_B$ over one or more periods to filter noise; and Step S5: transmitting sampling results from the sampling device AA and the sampling device BB to an analysis software C to calculate a transfer function of the device or the channel H to be measured.

In specific, the optoelectronic device or the channel H is a device or a transmission channel to be measured. The periodic excitation source G is controlled by the device/channel correlation analysis software C to generate the periodic excitation signal A. The period of the periodic excitation signal A per baud is T, the length of a code pattern of the periodic excitation signal A is M, and the periodic excitation signal A is repeated in a periodicity of baud length of M. $N_A$ is the noise of the excitation source, and $A+N_A$ is converted into signal B+noise $N_B$ after going through the optoelectronic device or the channel H. Noise NH is the noise generated by the device or the channel H to be measured. The signals A and B may be electrical signals or optical signals. The sampling device AA and the sampling device BB sample the input signal and the output signal. The sampled signals are averaged several times in the periodicity of the baud length of M. The noise signals are filtered by averaging the signals over the baud length of M. The samples of the signals A and B are input to the software. The transfer function of the device or channel H to be measured is obtained through correlation calculation, wherein the transfer function may be an impulse response, a pulse response, a frequency response, which reflects characteristics such as bandwidth, gain, reflection, impedance matching etc., of the device or the channel to be measured.

The transfer function is a transfer function in the usual sense, that is, an impulse response of a system. The pulse transfer function described below is a pulse response of a system. The difference between the above two cases lies in that: an input to the system is an impulse in the first case, while an input to the system is a pulse in the second case. The pulse refers to a signal transmitting a signal '1' at a specified baud rate. For example, if a period of data is 100 ps at a rate of 10 Gb/s, then a pulse at 10 Gb/s is a waveform which is '1' for 100 ps and '0' for rest of the time. When coming to a pulse, there will be a related rate of the pulse, thus a pulse response is also related to the rate. In theory, a pulse response is a convolution of a pulse signal at a certain rate and an impulse response of the system.

The periodic excitation signal A can be generated by a code pattern generator, an arbitrary waveform generator, a chip or an apparatus capable of such function.

The measurement of the device or the channel to be measured is based on the following two principles:

1. Randomness and Correlation of the Periodic Excitation Source

A signal that satisfies these characteristics may be a pseudo-random code (PRBS $2^7-1, 2^{10}-1, 2^{15}-1, 2^{23}-1 \ldots$), the length and code pattern of the pseudo-random code may be changed by adjusting a polynomial that generates the code pattern. For example, for PRBS code $2^7-1$ ($X^7+X^6+1$), which has a period length of the code pattern of 127, and its sequence D(i) is:

1,−1,−1,1,1,−1,1,1,−1,1,−1,1,1,−1 . . . .

This sequence is repeated every 127 bits, and an absolute value of a self-correlation function of this signal has the following characteristics:

When i=j, ABS (Correlation(D(i),D(j)))=M,

When i≠j, ABS (Correlation(D(i),D(j)))=1 or 0, wherein M is the period length of the code pattern of the sequence, and for PRBS code $2^7-1$, M=127. As M increases, the average (1/M) of its self-correlation function (i≠j) for the period length of the code pattern of the sequence approaches 0.

When a pulse waveform and an impulse sequence of code patterns in time domain are convolved in time domain, the signal A in FIG. 1 is obtained:

A=CONVOLVE(PULSE, $D_t(i)$), wherein PULSE is the pulse waveform, and $D_t(i)$ is the impulse sequence in time domain of code patterns sequence.

2. Filtering of Noise by Averaging Sampled Signals

As noise in the sampled signals is unavoidable, noise signal is filtered by calculating an average of one or more sets of signals from the sampled code patterns:

Average($A+N_A$)=average($A$)+average($N_A$)

Due to non-correlation of the noise signals, noise may be filtered by averaging the sampled signals such that calculation on the transfer function of the device or the channel to be measured is more accurate. Usually, 16 or more sets of sampled code patterns are averaged.

After filtering noise during sampling, the signal A generated by the excitation source is converted into the signal B after going through the device or the channel (H) to be measured, which may be expressed as:

$B(t)=H(t)*D_t(i)$, wherein $D_t(i)$ and B(t) are the impulse sequence of code patterns in time domain and the output sampled signals of the device or the channel to be measured, respectively. H(t) is a convolution matrix of the transfer function of the pulse response of the device or the channel to be measured. Both sides of the expression are simultaneously multiplied by the impulse sequence in time domain $D_t(i)$ of a sequence of code patterns of the excitation source D(i).

$B(t)*D_t(i)=H(t)*D_t(i)*D_t(i)$,

According to the aforementioned correlation characteristics of $D(j)$:$D_t(i)*D_t(i)=kM$, wherein k is a constant and is related to a number of sampled points per baud, and thus $H(t)=B(t)*D_t(i)/kM$.

The pulse transfer function of the device or the channel to be measured is a normalization result of a product of the output signal and impulse sequences in time domain of the input signal. kM is a constant, wherein k is determined by a number of sampled points per baud and M is the length of code patterns of the input signal. The impulse transfer function can be derived from the pulse transfer function, and a frequency response function in frequency domain may be derived by conducting an FFT operation.

When the periodic excitation signal A is not an ideal pulse output, the pure transfer function of the device or the channel to be measured may be obtained in a similar way of deriving a pulse response transfer function of A according to a product of A and an impulse sequence in time domain of the input signal, and then eliminating a pulse response effect of A from a pulse response transfer function obtained at point B via deconvolution.

An ideal device or channel is the one that has an output pulse which is exactly the same as the input pulse, i.e., the device has no other limitations such as bandwidth or amplitude. However, no actual device can have an output pulse which is exactly the same as the input pulse.

Through the above method, the transfer function of different optoelectronic devices or channels may be obtained easily in a transmission path as follows:

(1) from an electrical signal to an electrical signal: for example,
    a. an electric chip drives a laser, wherein an optical signal passes through an optical fiber, and then is converted into an electrical signal through a PD/APD or TIA;
    b. an electric chip drives a cable or PCB line to an input of the other end of the electric chip.
    c. the internal circuit of the electrical chip drives a package to the pins of the chip.

(2) from an electrical signal to an optical signal: for example,
    a. an electric chip drives a laser to generate an optical signal;
    b. an electric chip drives a laser to generate an optical signal, and the optical signal passes through an optical fiber to generate an optical signal.

(3) from an optical signal to an electrical signal
    a. an optical signal is converted into an electrical signal after going through a PD/APD;
    b. an optical signal is converted into an electrical signal after going through a PD/APD and then converted into an electrical signal after going through a TIA or other electric chip.

(4) from an optical signal to an optical signal
    a. an optical signal goes through an optical distribution or an optical fiber to generate an optical signal.

The present disclosure also provides a system for measuring an optoelectronic device and/or a channel. The system comprises:

Module M1: to configure a periodic excitation source to transmit a periodic excitation signal A;

Module M2: to sample an output signal $A+N_A$ at an output point of the periodic excitation signal A with a sampling device, and averaging the output signal $A+N_A$ over one or more periods to filter noise;

Module M3: inputting the sampled output signal $A+N_A$ as an input to a device or a channel H to be measured;

Module M4: sampling an output signal $B+N_B$ at an output point of the device or the channel H to be measured with a sampling device, and averaging the output signal $B+N_B$ over one or more periods to filter out noise; and Module M5: to transmit sampling results from the sampling device AA and the sampling device BB to an analysis software C to calculate a transfer function of the device or the channel H to be measured, and to obtain performance indexes such as loss, reflection and bandwidth of the device or the channel H to be measured.

Those skilled in the art are aware of that, in addition to implementing the system and its various means, modules, and units provided in the present disclosure in a form of a purely computer readable program code, it is entirely possible to enable the system and its various means, modules, and units provided in the present disclosure to implement the same functions in a form of logic gates, switches, Application Specific Integrated Circuits, programmable logic controllers, and embedded microcontrollers, etc., by logically programming the steps of the method. Thus, the system and its various means, modules, and units provided in the present disclosure can be considered as a hardware component. Also, the means, modules, and units for implementing various functions included therein can also be considered as structures within the hardware component. Alternatively, the means, modules, and units for implementing various functions included therein can be considered as software modules for implementing the method or structures within the hardware component.

Specific embodiments of the present disclosure are described above. It shall be understood that the present disclosure is not limited to the specific embodiments as described above. Those skilled in the art can make various changes or modifications within the scope of the claims, which do not affect the substance of the present disclosure. The embodiments and features in the embodiments of the present application may be combined with each other arbitrarily, provided that there is no conflict between them.

What is claimed is:

1. A method for measuring an optoelectronic device or a channel, comprising following steps:
    Step S1: controlling a periodic excitation source by a correlation analysis software C to transmit a periodic excitation signal A, wherein the periodic excitation signal comprises repeated sequences of code pattern and satisfies characteristics of randomness and correlation;
    Step S2: sampling an output signal $A+N_A$, at an output point of the periodic excitation signal A using a sampling device AA, and averaging the output signal $A+N_A$ over one or more periods to filter noise;
    Step S3: inputting the sampled output signal $A+N_A$ as an input to a device or a channel H to be measured;
    Step S4: sampling an output signal $B+N_B$ at an output point of the device or the channel H to be measured using sampling device BB, and averaging the output signal $B+N_B$ over one or more periods to filter noise; and
    Step S5: transmitting sampling results from the sampling device AA and the sampling device BB to the correlation analysis software C and calculating a transfer function of the device or the channel H to be measured through correlation calculation, wherein the transfer function of the device or the channel H is calculated based on $H(t)=B(t)*D_t(i)/kM$, $H(t)$ represents a convolution matrix of the transfer function of the device or the channel, $B(t)$ represents the sampled output signal of the device or the channel to be measured, $D_t(i)$ represents an impulse sequence of code patterns in time domain, k is determined by a number of sampled points per baud, and wherein M represents a length of the code pattern of the periodic excitation signal.

2. The method for measuring the optoelectronic device or the channel according to claim 1, wherein the periodic excitation signal A in step S1 is obtained by performing convolution in time domain on a pulse waveform and an impulse sequence of code patterns in time domain.

3. The method for measuring the optoelectronic device or the channel according to claim 1, wherein noise signal is filtered by averaging one or more sets of periodic excitation signals A from sampled code patterns in Step S2.

4. The method for measuring the optoelectronic device or the channel according to claim 1, wherein the excitation signal is selected as an electrical signal or an optical signal, and a corresponding electrical interface or an optical interface is selected for the sampling devices, according to the requirements of the device or the channel to be measured.

5. The method for measuring the optoelectronic device or the channel according to claim 1, wherein the pulse transfer function of the device or the channel H to be measured is a normalization result of a product of the output signal and impulse sequences in time domain of the input signal.

6. The method for measuring the optoelectronic device or the channel according to claim 1, wherein when the periodic excitation signal A is not an ideal pulse output, the pure transfer function of the device or the channel to be measured is obtained by deriving a pulse response transfer function of A according to a product of A and an impulse sequence in time domain of the input signal, and then eliminating a pulse response effect of A from a pulse response transfer function obtained at point B via deconvolution.

7. A system for measuring an optoelectronic device or a channel, comprising a processor and a memory, the memory communicatively coupled to the processor and comprising computer-readable instructions that upon execution by the processor cause the processor to:
    control a periodic excitation source by a correlation analysis software C to transmit a periodic excitation signal A, wherein the periodic excitation signal comprises repeated sequences of code pattern and satisfies characteristics of randomness and correlation;
    sample an output signal $A+N_A$ at an output point of the periodic excitation signal A using a sampling device AA, and averaging the output signal $A+N_A$ over one or more periods to filter noise;
    input the sampled output signal $A+N_A$ as an input to a device or a channel H to be measured;
    sample an output signal $B+N_B$ at an output point of the device or the channel H to be measured using a sampling device BB, and averaging the output signal $B+N_B$ over one or more periods to filter noise; and
    transmit sampling results from the sampling device AA and the sampling device BB to the correlation analysis software C and calculate a transfer function of the device or the channel H to be measured through correlation calculation, wherein the transfer function of the device or the channel H is calculated based on $H(t)=B(t)*D_t(i)/kM$, $H(t)$ represents a convolution matrix of the transfer function of the device or the channel, $B(t)$ represents the sampled output signal of the device or the channel to be measured, $D_t(i)$ represents an impulse sequence of code pattern in time domain, k is determined by a number of sampled points per baud, and wherein M represents a length of the code pattern of the periodic excitation signal.

8. A non-transitory computer readable storage medium having computer programs stored thereon, wherein the computer programs, when executed by a processor, implement following steps:
    Step S1: controlling a periodic excitation source by a correlation analysis software C to transmit a periodic excitation signal A, wherein the periodic excitation signal comprises repeated sequences of code pattern and satisfies characteristics of randomness and correlation;
    Step S2: sampling an output signal $A+N_A$, at an output point of the periodic excitation signal A using a sampling device AA, and averaging the output signal $A+N_A$ over one or more periods to filter noise;
    Step S3: inputting the sampled output signal $A+N_A$ as an input to a device or a channel H to be measured;
    Step S4: sampling an output signal $B+N_B$ at an output point of the device or the channel H to be measured using a sampling device BB, and averaging the output signal $B+N_B$ over one or more periods to filter noise; and
    Step S5: transmitting sampling results from the sampling device AA and the sampling device BB to the correlation analysis software C and calculating a transfer function of the device or the channel H to be measured through correlation calculation, wherein the transfer function of the device or the channel H is calculated based on $H(t)=B(t)*D_t(i)/kM$, H(t) represents a convolution matrix of the transfer function of the device or the channel, B(t) represents the sampled output signal of the device or the channel to be measured, $D_t(i)$ represents an impulse sequence of code pattern in time domain, k is determined by a number of sampled points per baud, and wherein M represents a length of the code pattern of the periodic excitation signal.

9. The non-transitory computer readable storage medium according to claim 8, wherein the periodic excitation signal A in step S1 is obtained by performing convolution in time domain on a pulse waveform and an impulse sequence of code patterns in time domain.

10. The non-transitory computer readable storage medium according to claim 8, wherein noise signal is filtered by averaging one or more sets of periodic excitation signals A from sampled code patterns in Step S2.

11. The non-transitory computer readable storage medium according to claim 8, wherein the excitation signal is selected as an electrical signal or an optical signal, and a corresponding electrical interface or an optical interface is selected for the sampling devices, according to the requirements of the device or the channel to be measured.

12. The non-transitory computer readable storage medium according to claim 8, wherein the pulse transfer function of the device or the channel H to be measured is a normalization result of a product of the output signal and impulse sequences in time domain of the input signal.

13. The non-transitory computer readable storage medium according to claim 8, wherein when the periodic excitation signal A is not an ideal pulse output, the pure transfer function of the device or the channel to be measured is obtained by deriving a pulse response transfer function of A according to a product of A and an impulse sequence in time domain of the input signal, and then eliminating a pulse response effect of A from a pulse response transfer function obtained at point B via deconvolution.

* * * * *